United States Patent [19]

Kuntschik et al.

[11] 3,965,177

[45] June 22, 1976

[54] CATALYTIC PROCESS

[75] Inventors: Lawrence F. Kuntschik; Robert S. Edwards, both of Nederland, Tex.

[73] Assignee: Texaco Inc., New York, N.Y.

[22] Filed: Apr. 15, 1974

[21] Appl. No.: 461,058

Related U.S. Application Data

[63] Continuation-in-part of Ser. No. 250,020, May 3, 1972, abandoned, which is a continuation-in-part of Ser. Nos. 202,022, Nov. 24, 1971, Pat. No. 3,799,984, and Ser. No. 737,866, June 18, 1968, Pat. No. 3,683,024.

[52] U.S. Cl............................................. 260/566 A
[51] Int. Cl.$^2$...................................... C07C 131/00
[58] Field of Search.............................. 260/566 AE

[56]     References Cited
         UNITED STATES PATENTS 3,040,097   6/1962   Bachman et al............... 260/566 AE

FOREIGN PATENTS OR APPLICATIONS 2,011,157   3/1970   France

OTHER PUBLICATIONS

Gaylord, "High Polymers vol. XIII," Polyethers part I, pp. 105–109, (1963).

Primary Examiner—Gerald A. Schwartz
Attorney, Agent, or Firm—T. H. Whaley; C. G. Ries; George J. Darsa

[57]     ABSTRACT

A catalytic process for preparing novel hydrocarbonaceous polymeric compounds by contacting a first hydrocarbonaceous compound with a second hydrocarbonaceous compound in the presence of a basic nitrogen catalyst in the substantial absence of water. The novel polymeric type materials provided by the process are useful as nonionic surfactants, as biodegradable detergents, as chemical intermediates in the production of anionic detergents, as lubricating oil additives, and as anti-rust and anti-icing additives in fuels.

17 Claims, No Drawings

CATALYTIC PROCESS

CROSS REFERENCE TO RELATED APPLICATIONS

This application is a continuation-in-part of our co-pending application Ser. No. 250,020 filed May 3, 1972 now abandoned which in turn is a continuation-in-part of applications Ser. No. 202,022 filed Nov. 24, 1971, now U.S. Pat. No. 3,799,984 issued Mar. 26, 1974 and Ser. No. 737,866 filed June 18, 1968, now U.S. Pat. No. 3,683,024 issued Aug. 8, 1972.

BACKGROUND OF THE INVENTION

This invention relates to a catalytic process for preparing novel hydrocarbonaceous polymeric type compounds. In particular, this invention provides a new catalytic process for producing hydrocarbonaceous polymeric compounds by reacting one hydrocarbonaceous compound possessing an isonitroso group with a second compound possessing a cyclic ether group.

This invention further relates to novel O-polyalkoxylated and substituted O-polyalkoxylated high molecular weight alkanone oximes. Moreover, this invention provides a new catalytic process for producing O-polyalkoxylated high molecular weight alkanone and alkanal oximes by the reaction of an oxirane with paraffin oximes.

An object of this invention is to provide a new catalytic process for preparing novel polymeric type materials.

Another object of this invention is to provide a novel catalytic process for preparing hydrocarbonaceous polymeric compounds.

Another object of this invention is to provide a novel catalytic process for preparing polymeric type materials of improved purity and color.

Yet another object of this invention is to provide a process for preparing novel surfactant compounds valuable as nonionic biodegradable detergents.

Other objects and advantages will become apparent from a reading of the following detailed description and examples.

SUMMARY OF THE INVENTION

Broadly, this invention contemplates a catalytic process for preparing a novel hydrocarbonaceous polymeric compound which comprises contacting in the presence of a basic nitrogen catalyst a first hydrocarbonaceous compound possessing an isonitroso group with from 2 to 40 moles of a second hydrocarbonaceous compound possessing a cyclic ether group per mole of said first compound in the substantial absence of water. The first hydrocarbonaceous compound possessing an isonitroso group contemplated herein is a paraffin oxime and the second hydrocarbonaceous compound possessing a cyclic ether group contemplated herein is an oxirane as defined below.

In particular, this invention contemplates a process for preparing novel O-polyalkoxylated high molecular weight alkanone and alkanal oximes which comprises contacting a paraffin oxime having at least 6 and preferably at least 10 carbon atoms with a basic nitrogen catalyst and from 2 to 40 moles of an oxirane per mole of paraffin oxime in the substantial absence of water.

The O-polyalkoxylated high molecular weight alkanone and alkanal oximes prepared by our process correspond to the formula:

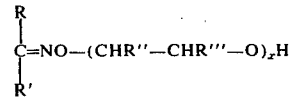

where R and R' are hydrogen or alkyl groups having from 1 to 11 carbon atoms or where R and R' together may form a polymethylene radical and where the sum of R and R' equals at least 5 and preferably at least 9, carbon atoms and up to 22 carbon atoms, preferably the sum equals from 9 to 12 carbon atoms, where R'' and R''' are hydrogen, alkyl groups having from 1 to 5 carbon atoms, cycloalkyl or aryl groups having from 6 to 20 carbon atoms and where $x$ equals from 2 to 40 and suitably from 3 to 40. In highly preferred embodiments $x$ is from 6 to 15. Contemplated within the scope of this invention are mixtures of O-polyalkoxylated high molecular weight n-alkanone and n-alkanal oximes where such compounds are prepared from mixtures of $C_{10}$ to $C_{13}$ or higher n-paraffin oximes.

Illustrative of O-polyalkoxylated high molecular weight n-alkanone oximes prepared according to the instant invention we mention O-5'-hydroxy-3'-oxapentyl 2-decanone oxime, O-5'-hydroxy-3'-oxapentyl 2-undecanone oxime, O-8'-hydroxy-2', 5', 8',-trimethyl-3', 6'-dioxaoctyl 6-undecanone oxime, O-8'-hydroxy-2', 5', 8'-triphenyl-3', 6'-dioxaoctyl 6-undecanone oxime, O-17'-hydroxy-3', 6', 9', 12', 15'-pentaoxaheptadecyl ($C_{10}$–$C_{13}$)-n-alkanone oxime and O-26'-hydroxy-3', 6', 9', 12', 15', 18', 21', 24'-octaoxahexacosyl ($C_{10}$–$C_{13}$)-n-alkanone oxime. As O-polyalkoxylated high molecular weight n-alkanal oximes we include O-17'-hydroxy-3', 6', 9', 12', 15'-pentaoxaheptadecyl ($C_{10}$–$C_{13}$)-n-alkanal oxime and O-26'-hydroxy-3', 6', 9', 12', 15', 18', 21', 24'-octaoxahexacosyl ($C_{10}$–$C_{13}$)-n-alkanal oxime. Products derived from cyclic oximes include O-5'-hydroxy-3'-oxapentyl cyclohexanone oxime and O-26'-hydroxy-3', 6', 9', 12', 15', 18', 21', 24'-octaoxahexacosyl cycloheptanone oxime.

According to this invention the contemplated oximes are derived from normal and cyclic paraffin oximes having at least 6 or at least 10 and up to 23 carbon atoms and preferably from 10 to 13 carbon atoms. Included as starting material we mention 2-hexanone oxime, cyclohexanone oxime, cycloheptanone oxime, 2-octanone oxime, 2-decanone oxime, 3-decanone oxime, 4-decanone oxime, 5-decanone oxime, 2-undecanone oxime, 3-undecanone oxime, 4-undecanone oxime, 5-undecanone oxime, 6-undecanone oxime, 2-dodecanone oxime, 4-dodecanone oxime, 6-dodecanone oxime, 2-tridecanone oxime, 3-tridecanone oxime, 5-tridecanone oxime, 7-tridecanone oxime, undecanal oxime, dodecanal oxime and tridecanal oxime along with mixtures thereof. In general, the paraffin oximes correspond to the formula:

where R and R' are as defined above. Such illustrative paraffin oximes contemplated as starting materials and listed above may be prepared, for example by photo-chemically reacting in a light transmittable reaction vessel a paraffin having 6 or 10 or more carbon atoms and up to 23 carbon atoms or a mixture of paraffins having 10 to 13 or more carbon atoms with a gaseous nitrosating agent such as nitrosyl halide, nitrosyl sulfuric acid or a mixed nitrosating agent such as nitric oxide and chlorine under a nitrosating agent partial pressure of at least 125 mm Hg. Further, the photochemical reaction is conducted under the influence of light excluding wave-lengths below 200 millimicrons such that high molar yields of oxime, up to 92% or higher, may be realized. Reaction temperatures of from 32° to 110°F. have been found to be applicable and the conversion product comprises approximately 95% of the n-paraffin oxime salt of, for example, hydrochloric acid which in turn is converted to the paraffin oxime by neutralization with a base such as aqueous ammonia or caustic soda. Separation of the oxime during neutralization is materially aided by employing a low boiling hydrocarbon exemplified by cyclohexane and pentane such that inorganic salts of neutralization are carried along in an aqueous phase with the low boiling hydrocarbon carrying along with oxime. The oximes may be recovered subsequently by evaporation of the hydrocarbon. The illustrative procedure described above for preparing normal paraffin oximes is described in U.S. Pat. No. 3,578,575 assigned to the assignee hereof and is hereby incorporated by reference.

Alternatively, the paraffin oxime may be prepared by any of the widely known classical procedures. In particular, oxime preparation by the reaction of alkanals and alkanones with hydroxylamines under appropriate conditions is generally applicable.

More specifically, the process of this invention comprises reacting a paraffin oxime, as hereinabove provided and defined, with an oxirane in the presence of a basic nitrogen catalyst that include basic nitrogen compounds illustrated by amines such as triethylamine, diethylmethylamine and dimethylethylamine. The catalysts contemplated in the instant invention are tertiary nitrogen compounds corresponding to the formula:

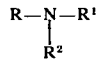

where R, R¹ and R² are alkyl, cycloalkyl or aryl groups or where R, R¹ and/or R² together with the nitrogen (N) are heterocyclic and where R, R¹ and R² are from 1 to 12, preferably from 1 to 6, carbons, and where the sum of R, R¹ and R² is from 3 to 36. Illustrative of the tertiary nitrogen compounds we mention tertiary aliphatic, alicyclic and aromatic amines including N-butyldidodecylamine, N,N-diethylallylamine, N,N-diethylcyclohexylamine, N,N-diethyldodecylamine, N,N-dimethylallylamine, N,N-dimethylbenzylamine, N,N-dimethyltertbutylamine, N,N-dimethyloctylamine, N,N-diisopropylethylamine, N,N-dimethylethylamine, N,N-diethylmethylamine, N,N-dimethylpropylamine, N,N-diethylpropylamine, N,N-ethylmethylpropylamine, N-ethyldibenzylamine, tributylamine, tridodecylamine, triethylamine, trihexylamine, trimethylamine, tricyclohexylamine, triisopropylamine and triphenylamine. Heterocyclic compounds contemplated include pyridine, methylpiperidine, 2-ethylpyridine, 1,4-dimethylpiperazine, 4-ethylpyridine, 2,4-lutidine, 3-picoline, 2,4,6-trimethylpyridine and quinoline. The preferred catalysts are triethylamine, pyridine, methylpiperidine, N,N-dimethylethylamine, N,N-diethylmethylamine, N,N-dimethylpropylamine, N,N-diethylpropylamine and N,N-ethylmethylpropylamine.

Highly preferred catalysts are trialkylamines of the group triethylamine, diethylmethylamine and dimethylethylamine.

In practice, the paraffin oxime is contacted with catalytic amounts of the basic nitrogen compound, generally in amounts of from 0.001 to 5.0, preferably 0.08 to 2.0, moles of catalyst per mole of paraffin oxime. The catalyst and oxime are intimately mixed in an inert atmosphere whereby trace amounts of water are eliminated from the system as by purging the system with an inert gas such as dry nitrogen at about 100°C. or at reduced pressure and at a correspondingly reduced temperature. Preferably, the catalyst and oxime are purged with an inert gas prior to heating the reaction mixture so as to avoid partial removal of the catalyst by gas purging. In practice, the oxime charged should be essentially anhydrous when charged to the reactor. Thereafter the oxirane is added to the substantially anhydrous environment such that 2 to 40, suitably 3 to 40 and preferably from 6 to 40 moles of oxirane are added per mole of paraffin oxime, at a rate of from 0.01 to 5 moles per hour of oxirane per mole of paraffin oxime. In a highly preferred embodiment 6 to 15 moles of oxirane are added per mole of paraffin oxime. Appropriate reaction temperatures range from about 0° to 300°C., generally 0° to 200°C., suitably 20° to 160°C. and we prefer to conduct the reaction at from about 40° to 90°C., under pressures ranging from sub-atmospheric to 100 p.s.i.g. The reaction time is normally between 1 and 24 hours although longer and shorter periods may be employed.

The oxiranes contemplated as starting materials correspond to the formula:

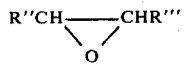

where R'' and R''' are as previously defined. Illustrative of the materials falling within the above formula we mention oxirane (ethylene oxide), methyloxirane, ethyloxirane, 2,3-dimethyloxirane, phenyloxirane, 2-methyl-3-phenyloxirane and cyclohexyloxirane.

An important aspect of this invention centers about conducting the reaction in the substantial absence of water. To successfully provide the designated O-polyalkoxylated high molecular weight alkanone and alkanal oximes in high yields with minimal amounts of polyalkylene glycols, a substantially anhydrous reaction medium is necessary such that water is present in an amount not exceeding 0.5 weight percent, and preferably not exceeding 0.1 weight percent. The presence of substantial amounts of water cause the oxirane to form polyethylene glycols. Moreover, it is particularly beneficial to employ catalysts having a water content less than 0.1 weight percent as the same results in reduced glycol formation. Catalysts possessing water contents in excess of 0.1 weight percent can be treated with for example potassium hydroxide or 4A molecular sieves so as to reduce their water content to less than 0.1 weight percent prior to using the same in the instant process. The treatment of the catalyst with either potassium hydroxide or 4A molecular sieves consists simply of mixing the catalyst therewith. The treatment of for example amines with potassium hydroxide pellets is the classical drying technique and the use of 4A sieves to remove water is described in Adams and Johnson, Laboratory Experiments in Organic Chemistry, Fourth Edition, The Mac Millan Company, pages 121–122. However, the desired characteristics and uses of the product will govern the permissible level of water within the limits specified above and ultimately the amount of glycol in the product.

While such non-aqueous environments as dioxane and tetrahydrofuran may be employed as reaction diluents, we in fact prefer to undertake the reaction of the paraffin oxime and the oxirane in the absence of added diluents. In a preferred embodiment the reactants themselves, particularly excessive amounts of catalyst such as triethylamine, dimethylethylamine, diethylmethylamine, etc., constitute the reaction medium. In contrast to the use of other materials as catalysts for the instant reaction such as sodium hydroxide, sodium ethoxide, lithium ethoxide and the like, the use of the tertiary nitrogen compounds function effectively as both catalyst and diluent. This is highly advantageous inasmuch as the nitrogen compounds particularly those of lower molecular weight contemplated as catalyst herein can be easily recovered from the reaction products by stripping and recycled for further use, whereas alkali catalysts require the use of tedious neutralization and product purification procedures. The higher molecular weight catalysts can be recovered by thin film distillation.

Moreover, the reaction medium may be composed of mixed $C_{10}$ to $C_{13}$ normal paraffin oximes along with mixtures of oxiranes. In another embodiment, the precursor paraffin oximes are provided as a crude oxime starting material such that the material contains from 90% and higher paraffin oximes along with lesser amounts of ketones. When operating with crude oximes starting materials, the polyalkoxylated higher molecular weight alkanone or alkanal oxime product is recovered in high purity and yield by employing such techniques as thin film evaporation of the reaction product such that ketones, unreacted oximes and low molecular weight monoalkoxylated or polyalkoxylated oximes are removed. Thin film evaporation, utilizing for example a Turba-Film Processor, is accomplished by distributing the product on the heated walls of an evaporator such that low boiling compounds are quickly vaporized and condensed. Short residence times are customarily employed to minimize product decomposition. In practice, the weight percent recovery of the final product has exceeded 90% and is in most instances 98% or better.

An unexpected benefit derived from the use of the instant basic nitrogen catalysts is the lighter burgundy color possessed by the polyalkoxylated oximes as opposed to the dark colored product recovered after the utilization of alkali catalysts. Another advantage of the instant process is that the product contains less ketone contaminants or by-products than processes employing alkali catalysts.

In a further embodiment of this invention, the color of the instantly produced polyalkoxylated oximes can, if desired, be altered to a shade of yellow. This is accomplished by treating the crude product with a mild oxidizing agent such as hydrogen peroxide, alkali hypochlorites or alkali hypobromites and alkaline earth hypochlorites or alkaline earth hypobromites such as sodium hypochlorite, potassium hypochlorite, sodium hypobromite, potassium hypobromite, calcium hypochlorite, magnesium hypochlorite, calcium hypobromite or magnesium hypobromite. Generally decolorization of the oxime is undertaken by treating with an aqueous solution of the oxidizing agent at a temperature of from about 0° to 300°F., preferably from about 50° to 150°F., so as to minimize ketone formation. Appropriate mole ratios of oxidizing agent to polyalkoxylated oxime range from 0.05:1 to 3.0:1 and we prefer to use ratios of 0.1:1 to 2.0:1. Depending upon the ultimately desired product color and purity, the treatment with the aforementioned oxidizing agents can be accomplished under a broad range of temperature conditions. In general, weaker solutions of oxidizing agent, for example 5 percent solutions, are employed at the higher temperatures whereas stronger aqueous solutions, such as 30 percent, are utilized at the milder treatment temperatures for periods of several minutes to 2 hours. In applications where the oxime product is not a critical factor, decolorization of the same may be omitted.

The novel polyalkoxylated high molecular weight alkanone and alkanal oximes prepared according to the instant invention are useful as biodegradable nonionic surfactants and detergents, and chemical intermediates in the production of anionic detergents. These products are also useful as lubricating oil additives and as anti-rust and anti-icing additives in fuels.

Polyethoxylated $C_{10}$–$C_{13}$ oximes exhibit detergency properties generally similar to other polyethoxylated compounds containing similar hydrophilic groups. When agitated in water the polyethoxylated $C_{10}$–$C_{13}$ oximes produce voluminous amounts of foam that subsequently requires several water rinses for complete removal. The formation of stable emulsions of water, mineral oil and polyethoxylated oximes further demonstrates the utility of these compounds as detergents. Moreover, the polyalkoxylated oximes recited herein where the value of X in the formula is 3 or higher possess solubility in water and are distinguishable over monomeric type compounds where X has a value of 1 where the latter are essentially insoluble in water. Water solubility represents an important property insofar as the utility of these compounds as detergents is concerned.

In order to more fully illustrate the nature of our invention and manner of practicing the same the following examples are presented.

EXAMPLE I 22.981 Kilograms of mixed $C_{10}$–$C_{13}$ n-paraffins were charged to a photoreactor and reacted with nitrosyl chloride under the influence of light excluding wavelengths below 200 millimicrons at 60°F. The gaseous NOCl and HCl was charged at the rate of 1.64 grams per minute and at 0.95 grams per minute respectively, to produce crude oximes at the rate of 1.83 grams per minute. After separation of the crude oxime acid salt, the acid was neutralized with aqueous ammonia and the crude $C_{10}$–$C_{13}$ oxime was separated. The molar selectivity to crude oximes was 87.4% with an overall recovery of 90.7 weight percent. The crude oxime product contained 4–5 weight percent $C_{10}$–$C_{13}$ ketones.

A 500 gram sample of crude $C_{10}$–$C_{13}$ oximes prepared according to the above procedure was mixed with 50.0 grams of anhydrous $Na_2CO_3$ at 100°C. for 4 hours. After cooling, the mixture was diluted with 1.0 liter of acetone and filtered. The acetone was removed from the filtrate under vacuum to yield an oxime product (428.0 grams) containing less than 1.0 weight percent ketone. Continuous thin film distillation of the treated oxime at 95° to 115°C. at 0.05 to 0.1 mm Hg pressure yielded a light yellow colored oxime.

234 grams (1.25 mole) of purified oxime as prepared above and 100 grams of triethylamine (0.99 mole) were charged to a 2 liter reactor and heated to 145°F. after purging the reactor with nitrogen. Ethylene oxide (oxirane), 503 grams (11.4 moles), was charged to the reactor at an average rate of 114.2 grams per hour under a reactor pressure of 0 to 30 p.s.i.g. while maintaining the temperature at 140° to 155°F. After removal of triethylamine in vacuo, 718 grams of a light burgundy colored product was recovered.

The product was treated with 5.6 weight percent basis the product of a 15 weight percent hydrogen peroxide solution at 70° to 75°F. for one-half hours. After saturation with sodium chloride, the peroxide treated product was extracted twice with equal volumes of chloroform. After removal of the chloroform under vacuum, the product identified as O-26'-hydroxy-3', 6', 9', 12', 15', 18', 21', 24'-octaoxahexacosyl-($C_{10}$–$C_{13}$)-n-alkanone oximes possessed as ASTM color of less than 3.0. The detergency properties of this product was determined using cotton fabric and a one percent stock solution. The detergency test resulted in an outstanding detergency coefficient of 156 for the instant product as opposed to a coefficient of 100 for a commercially available standard detergent.

EXAMPLE II

Purified $C_{10}$–$C_{13}$ oximes, 187.0 grams (1.0 mole) prepared as in Example I, 50 grams of triethylamine and 100 grams of cyclohexane previously dried over a 4A molecular sieve were charged to a 2 liter stirred reactor and reacted with 268 grams (6.1 moles) of ethylene oxide (oxirane) at 145°F. after purging the reactor with nitrogen in the manner described in Example I. After removal of the triethylamine and cyclohexane under vacuum, 586 grams of a burgundy colored product was obtained. Treatment of the product with hydrogen peroxide in accordance with the procedure set out in Example I yielded a light yellow colored product designated O-17'-hydroxy-3', 6', 9', 12', 15'-pentaoxaheptadecyl ($C_{10}$–$C_{13}$)-n-alkanone oximes. The detergency test as in Example I resulted in an outstanding detergency coefficient of 166.

EXAMPLE III

Purified $C_{10}$–$C_{13}$ oximes, 187.0 grams (1.0 mole) prepared as in Example I, 100 grams of triethylamine and 400.0 grams (9.1 moles) of ethylene oxide (oxirane) were reacted in the manner described in Example I. After removal of the triethylamine under vacuum, 587 grams of product were recovered. The elemental analysis based on weight percent found: carbon 57.50, hydrogen 9.85, nitrogen 2.90, oxygen 29.75 and $C_{10}$–$C_{13}$ ketones 6.5. The product identified as O-26'-hydroxy-3', 6', 9', 12', 15', 18',21', 24'-octaoxahexacosyl-($C_{10}$–$C_{13}$)-n-alkanone oximes possessed as ASTM color of 7.5 (burgundy) and a detergency coefficient of 183.

EXAMPLE IV

Crude $C_{10}$–$C_{13}$ oxime, 187.0 grams (1.0 mole), prepared as in Example I, and 101 grams (1.0 mole) of triethylamine were charged to a 2 liter reactor and heated to 140°F. after purging with nitrogen. 399 grams (9.07 moles) of ethylene oxide (oxirane) were charged to the reactor at an average rate of 69.4 grams per hour under a reactor pressure of 30 p.s.i.g. A dark colored product, 575 grams, recovered after removal of triethylamine under vacuum. The product possessed a detergency coefficient of 170.

EXAMPLE V

The dark product of Example IV (100 grams) was treated with a mixture of 30 percent hydrogen peroxide and 10 grams of deionized water at 75° to 110°F. for 30 minutes. After treatment the mixture was saturated with ammonium chloride and extracted with two volumes of chloroform. The chloroform extract yielded 88.0 grams of a light orange colored product having a detergency coefficient of 150 after filtration and removal of the chloroform under vacuum.

EXAMPLE VI

Varying quantities of 2-undecanone oxime, trimethylamine and ethylene oxide indicated below in Table I were charged to a 2 liter reactor and reacted at 145°F. under 0 to 30 p.s.i.g. as described in Example I.

TABLE I

|  | A | B | C |
| --- | --- | --- | --- |
| 2-Undecanone oxime wt., gms | 111 | 111 | 111 |
| Triethylamine wt., gms | 100 | 100 | 100 |
| Ethylene oxide wt., gms | 84 | 164 | 241 |
| Oxirane/oxime mole ratio | 3.18 | 6.22 | 9.14 |

Product analysis of nuclear magnetic resonance identified each product as:

A - O-8'-hydroxy-3', 6'-dioxaoctyl 2-undecanone oxime

B - O-17'-hydroxy-3', 6', 9', 12', 15'-pentaoxaheptadecyl 2-undecanone oxime

C - O-26'-hydroxy-3', 6', 9', 12', 15', 18', 21', 24'-octaoxahexacosyl 2-undecanone oxime

We claim:

1. A process for preparing O-polyalkoxylated high molecular weight alkanone or alkanal oximes which comprises contacting a paraffin oxime corresponding to the formula:

where R and R' are hydrogen or alkyl groups having from 1 to 11 carbon atoms and where the sum of R and R' is 9 to 12 carbon atoms with a basic nitrogen catalyst selected from the group consisting of triethylamine, pyridine, methylpiperidine, N,N-dimethylethylamine, N,N-diethylmethylamine, N,N-dimethylpropylamine, N,N-diethylpropylamine and N,N-ethylmethylpropylamine and from 2 to 40 moles of an oxirane per mole of said oxime in the substantial absence of water and where said O-polyalkoxylated oxime is subsequently contacted with a mild oxidizing agent.

2. A process for preparing O-polyalkoxylated high molecular weight alkanone or alkanal oximes which comprises contacting a paraffin oxime corresponding to the formula:

where R and R' are hydrogen or alkyl groups having from 1 to 11 carbon atoms and where the sum of R and R' is 9 to 12 carbon atoms with a basic nitrogen catalyst, said catalyst corresponding to the formula:

where R, R¹ and R² are alkyl, cycloalkyl or aryl groups or where R, R¹ and/or R² together with N are heterocyclic and where R, R¹ and R² are 1 to 12 carbons and where the sum of R, R¹ and R² is 3 to 36 carbons, and from 2 to 40 moles of an oxirane per mole of said oxime in the substantial absence of water.

3. A process according to claim 2 wherein said paraffin oxime is a mixture of $C_{10}$ to $C_{13}$ n-paraffin oximes.

4. A process according to claim 2 wherein from 6 to 15 moles of said oxirane are contacted per mole of said oxime.

5. A process according to claim 2 wherein said catalyst is a trialkylamine.

6. A process according to claim 2 wherein said catalyst is selected from the group consisting of triethylamine, pyridine, methylpiperidine, N,N-dimethylethylamine, N,N-diethylmethylamine, N,N-dimethylpropylamine, N,N-diethylpropylamine and N,N-ethylmethylpropylamine.

7. A process according to claim 2 wherein said catalyst is triethylamine.

8. A process according to claim 2 wherein said oxirane is ethylene oxide.

9. A process according to claim 2 wherein said oxirane is methyloxirane.

10. A process according to claim 2 wherein said oxirane is phenyloxirane.

11. A process according to claim 2 wherein said O-polyalkoxylated oximes are subsequently contacted with a mild oxidizing agent.

12. A process according to claim 11 wherein said oxidizing agent is selected from the group consisting of hydrogen peroxide, alkali hypochlorites, alkaline earth hypochlorites, alkali hypobromites and alkaline earth hypobromites.

13. A process according to claim 11 wherein said oxidizing agent is hydrogen peroxide.

14. A process for preparing O-polyalkoxylated high molecular weight alkanone or alkanal oximes which comprises contacting a paraffin oxime corresponding to the formula:

where R and R' are hydrogen or alkyl groups having from 1 to 11 carbon atoms and where the sum of R and R' is from 9 to 12 carbon atoms with a basic nitrogen catalyst selected from the group consisting of triethylamine, diethylmethylamine and dimethylethylamine, and from 6 to 15 moles of an oxirane per mole of said oxime in the substantial absence of water.

15. A process according to claim 14 wherein said catalyst is triethylamine.

16. A process according to claim 14 wherein said oxirane is ethylene oxide.

17. A process according to claim 14 wherein said oxime is a mixture of $C_{10}$ to $C_{13}$ n-paraffin oximes.

* * * * *